(12) United States Patent
Quiros Perez

(10) Patent No.: US 8,360,494 B2
(45) Date of Patent: Jan. 29, 2013

(54) VEHICLE CARGO SYSTEM WITH INTEGRATED RAILS

(75) Inventor: Flor Elena Quiros Perez, Mexico City (MX)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/085,726

(22) Filed: Apr. 13, 2011

(65) Prior Publication Data

US 2012/0261935 A1 Oct. 18, 2012

(51) Int. Cl.
*B60N 2/44* (2006.01)
(52) U.S. Cl. ................................................. 296/24.4
(58) Field of Classification Search ............... 296/24.4
See application file for complete search history.

(56) References Cited

U.S. PATENT DOCUMENTS

| | | | | |
|---|---|---|---|---|
| 6,312,034 B1 * | 11/2001 | Coleman et al. | ............. | 296/26.1 |
| 7,059,646 B1 * | 6/2006 | DeLong et al. | ............. | 296/24.43 |
| 7,731,461 B2 * | 6/2010 | Stoeckl et al. | ................ | 410/104 |
| 2003/0184107 A1 * | 10/2003 | Hapspel et al. | ............... | 296/24.1 |
| 2004/0217614 A1 * | 11/2004 | Schlecht | ....................... | 296/24.4 |
| 2007/0018473 A1 * | 1/2007 | Alliger et al. | ................ | 296/24.4 |

* cited by examiner

*Primary Examiner* — H Gutman
(74) *Attorney, Agent, or Firm* — Quinn Law Group, PLLC

(57) ABSTRACT

A cargo system includes first and second rails extending longitudinally along first and second side walls of a vehicle. A load floor has multiple panels hinged to one another. The rails are configured to support the load floor above a floor of the vehicle. The load floor is movable along the rails between an extended position and a retracted position. The multiple panels of the load floor divide the cargo area into a first portion below the load floor and above the vehicle floor and a second portion above the load floor. The multiple panels substantially uncover the vehicle floor when the load floor is in the retracted position. The cargo system may also include a cargo retainer. The rails support the cargo retainer such that the cargo retainer spans between the rails and is above the load floor when the load floor is in the extended position.

15 Claims, 2 Drawing Sheets

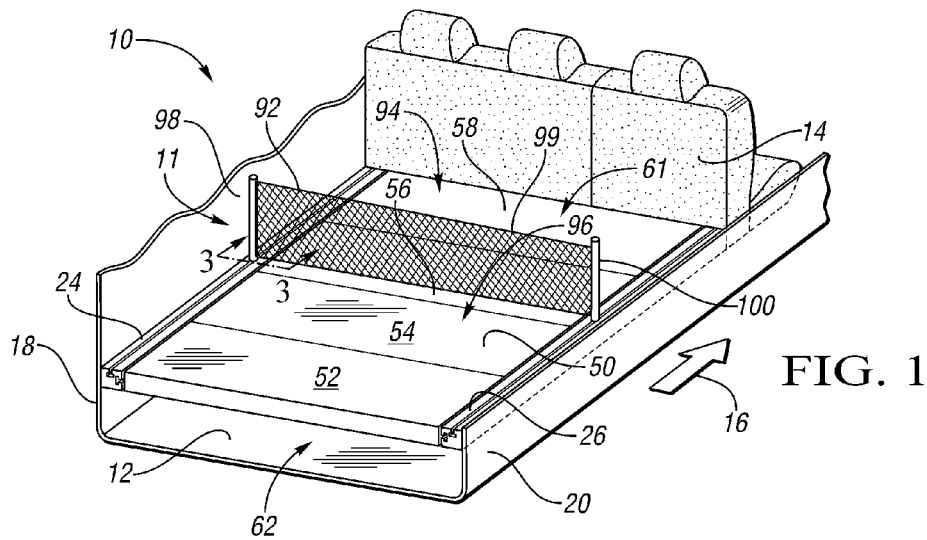
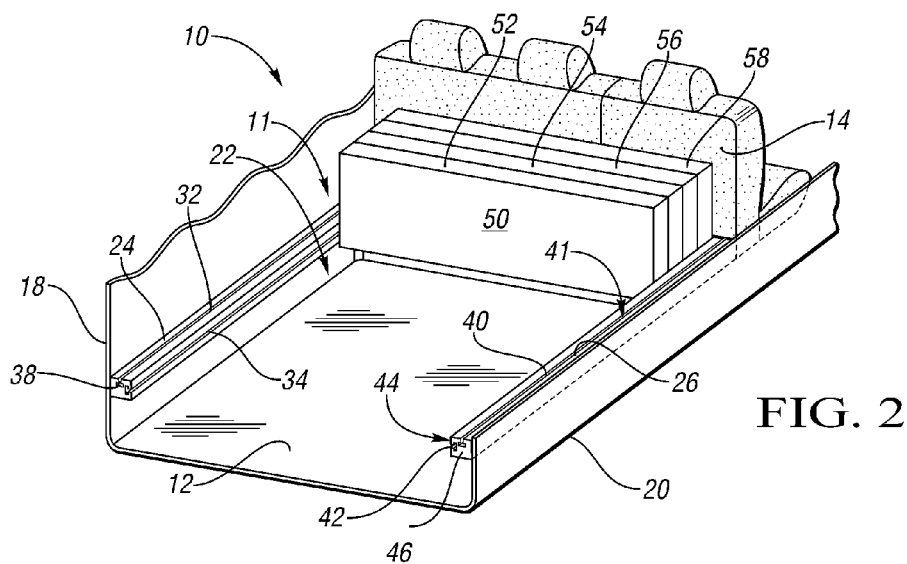
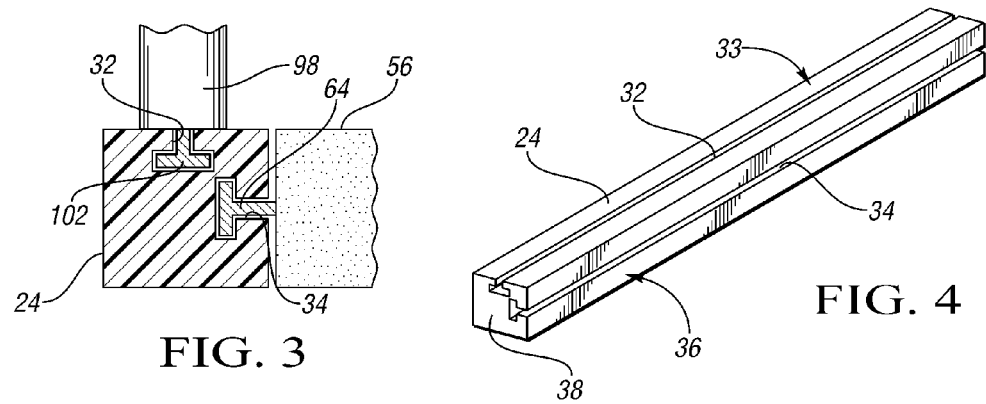

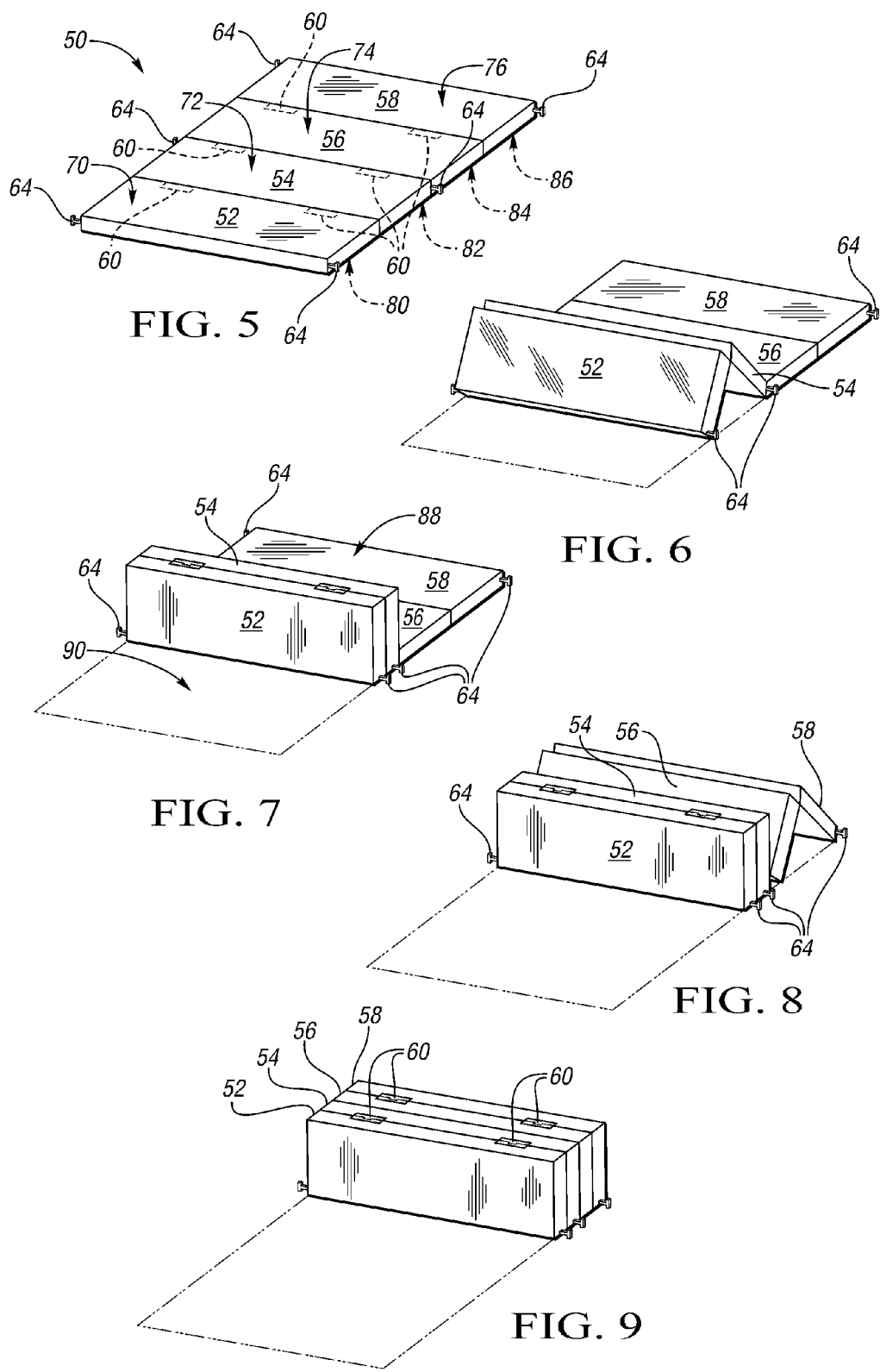

VEHICLE CARGO SYSTEM WITH INTEGRATED RAILS

TECHNICAL FIELD

The invention relates to a cargo system for a cargo area of a vehicle.

BACKGROUND

Many customers purchase sport utility vehicles or pickup trucks in part due to their relatively large cargo areas and corresponding cargo-carrying capabilities. Factory and aftermarket cargo storage organizer systems are available that help subdivide cargo area to provide additional support surfaces. These systems are often bulky, require numerous components, and can be difficult to use. For example, some cargo load floors extend horizontally above a vehicle floor. These designs often require that the entire load be lifted to access cargo stored under the load floor. This can be inconvenient and difficult for vehicle owners.

SUMMARY

A cargo system for a vehicle is provided that increases customer cargo storage options, is easily repositionable to meet current cargo loading requirements, and is at least partially removable when not in use to reduce vehicle weight and increase fuel economy. The vehicle has a vehicle floor and first and second side walls that oppose one another. The vehicle floor and the side walls partially define a cargo area, such as in a sport utility vehicle or a pickup truck. The cargo system includes first and second rails configured to extend longitudinally, such as along the respective first and second side walls when installed in the vehicle. The cargo system includes a load floor that has multiple panels hinged to one another. The rails are configured to support the load floor, with the load floor extending between the rails. The load floor is movable along the rails between an extended position and a retracted position. When in the extended position, the multiple panels of the load floor divide the cargo area into a first portion that is below the load floor, and a second portion above the load floor. When installed on a vehicle, the first portion is also above the vehicle floor, and the multiple panels substantially uncover the vehicle floor when the load floor is in the retracted position.

The cargo system may also include a cargo retainer such as a cargo net. The rails may be further configured to support the cargo retainer such that the cargo retainer spans between the rails and is above the load floor when the load floor is in the extended position. For example, the cargo retainer may extend vertically from the rails above the horizontally-extending load floor. Accordingly, the cargo retainer divides the cargo area above the load floor between a forward cargo area and a rearward cargo area.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic perspective illustration of a portion of a vehicle having a cargo system that includes longitudinal rails, a cargo divider, and a load floor shown in an extended position;

FIG. 2 is a schematic perspective illustration of the portion of the vehicle of FIG. 1 with the load floor shown in a retracted position;

FIG. 3 is a schematic cross-sectional illustration of one of the rails taken at the lines 3-3 in FIG. 1;

FIG. 4 is a schematic perspective illustration of one of the rails;

FIG. 5 is a schematic perspective illustration of the load floor in an extended position;

FIG. 6 is a schematic perspective illustration of the load floor of FIG. 5 with some of the panels being partially folded toward the retracted position;

FIG. 7 is a schematic perspective illustration of the load floor of FIG. 6 in an intermediate position in which the load floor serves as a cargo divider;

FIG. 8 is a schematic perspective illustration of the load floor of FIG. 7 moved further toward the retracted position; and FIG. 9 is a schematic perspective illustration of the load floor of FIG. 8 in the retracted position.

DETAILED DESCRIPTION

Referring to the drawings, wherein like reference numbers refer to like components throughout the several views, FIG. 1 shows a portion of a vehicle 10 with a vehicle cargo system 11 that enables easy and versatile management of cargo loading options. The vehicle 10 has a vehicle floor 12 that may be steel or other suitable material. The floor 12 may be several components connected in an assembly, as is known. The floor 12 extends rearward of the rearmost vehicle seats 14. The seats 14 may be second or third row of seats in a sport utility vehicle or the like. Alternatively, the seats 14 may be the front seats in a vehicle having only one row of seats, such as a pickup. The forward facing direction in the vehicle 10 is indicated by arrow 16.

The vehicle 10 includes a first side wall 18 and an opposing second side wall 20. The side walls 18, 20 are shown only in fragmentary partial view. The side walls 18, 20 may each be an assembly of multiple components, such as an outer panel, an inner panel, and trim components, and other components that generally are included in a vehicle side wall. The floor 12, the seats 14, and the side walls 18, 20 partially define a vehicle cargo area 22, best shown in FIG. 2. The cargo area 22 extends behind the seats 14, between the side walls 18, 20, and above the floor 12. A vehicle roof (not shown) and rear closure panels (not shown) further define the cargo area 22.

The cargo system 11 includes a first rail 24 extending longitudinally along the first side wall 18, and a second rail 26 extending longitudinally along the second side wall 20. The rails 24, 26 may be welded, bolted, fastened, or otherwise secured to the side walls 18, 20. The rails 24, 26 are thus integrated into the vehicle 10. As further discussed below, the rails 24, 26 are configured to be dual-purpose rails in that they support a load floor 50 as well as a cargo retainer 92. Further, the rails 24, 26 are configured for easy removal of either or both of the load floor 50 and the cargo retainer 92 when not desired in the vehicle, thereby decreasing overall vehicle weight and increasing fuel efficiency.

Referring to FIG. 4, the first rail 24 has an upward-opening slot 32 that extends longitudinally along the first rail 24 in an upward-facing surface 33. The first rail 24 also has an inboard-opening slot 34 that extends longitudinally along the first rail in an inboard-facing surface 36 so that the slot 34 opens in an inboard direction. The slot 34 is referred to herein as a first longitudinal slot, and the slot 40 is referred to as a second longitudinal slot. As used herein, an "inboard" direction is a direction toward a longitudinal centerline of the vehicle 10. Both of the slots 32, 34 extend the full length of the rail 24 so that the slots 32, 34 open at a rearward-facing end 38 of the rail 24.

As best shown in FIG. 3, each of the slots 32, 34 is generally T-shaped. Other shapes of the slots 32, 34 are within the scope of the invention, and the slots 32, 34 need not be the same shape. Although only the slots 32, 34 of rail 24 are shown in detail, referring to FIG. 2, the second rail 26 is a mirror image of the first rail 24 and also has an upward-opening slot 40 that extends longitudinally along the second rail 26 in an upward-facing surface 41. The slot 40 is referred to herein as a second longitudinal slot of the second rail 26. The second rail 26 also has an inboard-opening slot 42, referred to as a second longitudinal slot that extends longitudinally along the first rail 26 in an inboard-facing surface 44 so that the slot 42 opens in an inboard direction. Both of the slots 40, 42 extend the full length of the rail 26 so that the slots 40, 42 open at a rearward-facing end 46 of the rail 26.

Referring again to FIG. 1, the cargo system 11 also includes a load floor 50 that has multiple panels 52, 54, 56, and 58 hinged to one another. Specifically, referring to FIG. 9, panel 52 is hinged to panel 54 with hinges 60, and panel 56 is hinged to panel 58 with hinges 60. Additional hinges 60 hinge the panel 54 to the panel 56 as shown in phantom in FIG. 5. Although shown as traditional hinges connected to the panels 52, 54, 56 and 58, the panels 52, 54, 56 and 58 may instead be formed with living hinges that connect the panels to one another, or with rods extending through channels in the adjacent panels, or any other known hinge configurations.

In FIG. 1, the load floor 50 is shown in an extended position in which each of the panels 52, 54, 56, and 58 is generally coplanar and parallel with the rails 24, 26 to divide the cargo area 22 into a first portion 61 above the load floor 50 (and below the roof (not shown)), and a second portion 62 below the load floor 50 and above the vehicle floor 12. The load floor 50 may be any material with a predetermined strength appropriate for supporting a predetermined load. With the load floor 50 in the extended position of FIG. 1, cargo may be placed on the load floor in the first portion 61 of the cargo area, and additional cargo may be placed on the floor 12 below the load floor 50 in the second portion 62 of the cargo area. With the load floor 50 in the extended position, the floor space of the cargo area 22 is substantially doubled.

Referring to FIG. 5, the load floor 50 includes multiple lateral extensions 64 extending toward the rail 26 and side wall 20 of FIG. 1 from the panel 52, the panel 58, and from either panel 54 or panel 56 near where panels 54, 56 are hinged to one another. Substantially identical lateral extensions 64 extend laterally from the panels 52, 54 or 56, and 58 toward the side wall 18 and rail 24. The extensions 64 may be formed integrally with the load floor 50, or may be separate components secured to the load floor 50.

Referring to FIG. 3, one of the lateral extensions 64 is shown in the slot 34 of the rail 24 so that the rail 24 supports the panel 56. The lateral extension 64 is generally T-shaped so that it fits into the generally T-shaped slot 34. Each of the lateral extensions 64 fits into the respective slots 32, 34, 40, 42 of one of the rails 24, 26 of FIG. 2 in this manner so that the load floor 50 is securely supported by the rails 24, 26 above the vehicle floor 12. Although the slots 32, 34, 40, 42 and the lateral extensions 64 are T-shaped, other shapes may be used that are complementary so that the slots 32, 34, 40, 42 securely capture the lateral extensions 64 when the load floor 50 is installed on the vehicle 10. The slots 34, 42 open at the ends 38, 46 of the rails 24, 26, and so allow the lateral extensions 64 to be slid into or out of the slots 34, 42 at the ends 38, 46 to install or remove the load floor 50 from the vehicle 10.

In FIG. 2, the load floor 50 is shown moved to a retracted position in which the panels 52, 54, 56, 58 are stacked face-to-face to substantially uncover the vehicle floor 12. Referring to FIG. 5, the panels 52, 54, 56 and 58 have respective upper surfaces or faces 70, 72, 74 and 76 and opposing respective lower surfaces or faces 80, 82, 84, 86. When the panels are moved from the extended position of FIG. 1 to the retracted position of FIG. 2 by sliding the lateral extensions 64 in the slots 34, 42 forward toward the seats 14, the hinges 60 allow the panels 52, 54, 56 and 58 to fold together so that the surfaces 72, 74 are face-to-face in the retraced position of FIG. 2.

To move from the extended position of FIGS. 1 and 5 to the retracted position of FIGS. 2 and 9, a vehicle user need only push the panel 52 in the forward direction 16 of FIG. 1 to cause the panels 52 and 54 to begin collapsing, as in FIG. 6. In FIG. 7, the load floor 50 is pushed further to an intermediate position with the panels 52, 54 generally upright or vertical, so that they are perpendicular to the vehicle floor 12 and the side walls 18, 20 of FIG. 1. In the intermediate position of FIG. 7, the cargo area 22 is divided into a forward cargo area portion 88 and a rearward cargo area portion 90. There is also a third cargo area portion under the panels 56, 58 and above the floor 12 of FIG. 1. In the intermediate position, the load floor 50 functions as a cargo divider. Optionally, locks or stoppers could be used to secure the panels 52, 54 in the intermediate position. In FIG. 8, the load floor 50 is pushed further forward along the rails 24, 26 so that the panels 56, 58 begin to fold, until the load floor 50 reaches the retracted position of FIG. 9.

Thus, to retrieve cargo in the cargo area portion 62 shown in FIG. 1 beneath the load floor 50, the load floor 50 need only be pushed forward far enough to uncover the cargo. Unlike the case with known load floor dividers, the entire load floor 50 need not be lifted. In fact, no portion of the load floor 50 is lifted: it is only pushed fore and aft along the rails 24, 26 to reconfigure the cargo area 22 into various cargo area portions.

Referring again to FIG. 1, the cargo system 11 also includes a cargo retainer 92 supported by the rails 24, 26 such that the cargo retainer 92 spans between the rails 24, 26 and is above the load floor 50 when the load floor 50 is in the extended position. The cargo retainer 92 divides the portion 61 of the cargo area 22 above the load floor 50 between a forward cargo area 94 and a rearward cargo area 96. When supported by the rails 24, 26 in this position, the cargo retainer 92 extends substantially perpendicular to the side walls 18, 20 and to the load floor 50 when the load floor 50 is in the extended position. The cargo retainer 92 is not limited to an embodiment that is perpendicular to the side walls 18, 20 and the load floor 50.

The cargo retainer 92 includes first and second support posts 98, 100, each having a terminal end supported in the respective upward-facing slots 32, 40. A net 99 is attached to the posts 98, 100 and extends between the posts 98, 100. Alternatively, instead of a net, a screen or panel could extend between the posts 98, 100. Referring to FIG. 3, the post 98 has a terminal end 102 that is T-shaped to complement the T-shaped slot 32. This allows the slot 32 to receive the terminal end 102 at the end 38 of the rail 24, and the post 98 is then slid forward in the slot 32 to a desired position along the rail 24, and is supported by the rail 24. The post 100 has a similar T-shaped terminal end that is received in the T-shaped slot 40. This terminal end is not shown, but is identical to the terminal end 102. Because the slots 32, 40 are open at ends 38, 46 of the rails 24, 26, the terminal ends 102 of the support posts 98, 100 are removable from the first and the second slots by moving the posts 98, 100 pasts the ends 38, 46 of the rails 24, 26. The cargo retainer 92 is thus easily removable from the vehicle 10 when not in use to reduce vehicle weight and improve fuel economy.

The rails 24, 26, each with their two longitudinal slots (the inboard-facing slots 34, 42 and the upward-facing slots 32, 40), allow the use of the load floor 50 in various positions, as well as the cargo retainer 92, to customize the cargo area 22 into different cargo area portions to best separate, support, and retain different cargo loads. The load floor 50 is easily positioned in the extended position of FIG. 1, the retracted position of FIG. 2, or the intermediate position of FIG. 7. Furthermore, the load floor 50 is easily removed from the rails 24, 26, as is the cargo retainer 92. Because the rails 24, 26 are integrated into the vehicle 10, as they are permanently affixed to the side walls 18, 20, they are always correctly positioned to serve as both a guide for positioning and supporting the load floor 50 and the cargo retainer 92. The guide rails 24, 26 provide support for the cargo load floor 50, which extends horizontally in the extended position. The guide rails 24, 26 also support for the vertically-extending cargo retainer 92. Thus, the guide rails 24, 26 enable the cargo area 22 to be divided both into fore and aft and upper and lower portions.

While the best modes for carrying out the invention have been described in detail, those familiar with the art to which this invention relates will recognize various alternative designs and embodiments for practicing the invention within the scope of the appended claims.

The invention claimed is:

1. A cargo system for a vehicle comprising:
   first and second rails configured to extend longitudinally, each having a first slot extending longitudinally along the respective rail;
   a load floor having multiple panels with adjacent ones of said multiple panels panels hinged to one another at adjacent edges so that the multiple panels are interconnected;
   extensions extending from the multiple panels and configured to fit within the first slots to retain the multiple panels to the rails, some of said extensions being adjacent a first terminal end of said interconnected panels and others of said extensions being adjacent a second terminal end of said interconnected panels to retain the first and second terminal ends to the rails;
   wherein the rails are configured to support the load floor with the load floor extending between the rails;
   wherein the load floor is configured to be movable along the rails between an extended position and a retracted position, with at least one pair of the adjacent edges that are hinged to one another being free from the rails so that said at least one pair of adjacent edges moves away from the rails and the first and second terminal ends of said interconnected panels are retained at the rails when the load floor is moved from the extended position to the retracted position; and wherein the multiple panels and the rails partially define a first portion of a cargo area below the load floor and a second portion of a cargo area above the load floor when the load floor is in the extended position.

2. The cargo system of claim 1, further comprising:
   a cargo retainer; wherein the rails are further configured to support the cargo retainer such that the cargo retainer spans between the rails and is above the load floor when the load floor is in the extended position, the cargo retainer thereby dividing the first portion of the cargo area above the load floor between a forward cargo area and a rearward cargo area.

3. The cargo system of claim 2, wherein the cargo retainer extends substantially perpendicular to the load floor when the load floor is in the extended position.

4. The cargo system of claim 2, wherein each of the first and the second rails has a second longitudinal slot running fore and aft along the respective rail; wherein the cargo retainer includes first and second support posts that have terminal ends;
   and wherein the second slots have respective shapes that are complementary to respective shapes of the terminal ends of the first and the second support posts, so that the second slots receive the terminal ends of the respective support posts.

5. The cargo system of claim 4, wherein the second slots are open at ends of the rails so that the terminal ends of the support posts are removable from the second slots by moving the posts pasts the ends of the rails, the cargo retainer thereby being removable from the rails.

6. The cargo system of claim 4, wherein the second slots and the terminal ends of the support posts are generally T-shaped.

7. The cargo system of claim 1, wherein the first slots and the extensions have complementary shapes so that the rails support the load floor by the extensions in the first slots.

8. The cargo system of claim 7, wherein the first slots are open at ends of the rails so that the load floor is removable from the rails by sliding the load floor past the ends of the rails.

9. The cargo system of claim 7, wherein the first slots and the extensions are generally T-shaped.

10. The cargo system of claim 1, wherein the load floor is movable to an intermediate position in which some of the panels are folded together to extend substantially perpendicular to others of the panels that remain in the extended position.

11. The cargo system of claim 10, wherein each of the panels has faces; and wherein respective ones of the faces of the panels that are folded together are adjacent one another.

12. A cargo system for a vehicle, the cargo system comprising:
   first and second rails configured to extend longitudinally generally parallel with one another; wherein each of the first and second rails defines a respective first longitudinal slot running fore and aft and opening toward the other of the first and the second rails; wherein each of the first and the second rails defines a respective second longitudinal slot running fore and aft and opening upward along the respective rail;
   a load floor having multiple panels hinged to one another;
   wherein the rails are configured to support the load floor with the load floor extending between the rails and supported by each rail in the respective first longitudinal slot;
   a cargo retainer; wherein each rail is further configured to support the cargo retainer in the respective second longitudinal slot such that the cargo retainer spans between the rails and is above the load floor when the load floor is in the extended position, the cargo retainer thereby partially defining with the load floor a forward cargo area above the load floor and forward of the cargo retainer and a rearward cargo area above the load floor and rearward of the cargo retainer;
   wherein the load floor is configured to be movable along the rails between an extended position and a retracted position; wherein the multiple panels partially define a first portion of a cargo area below the load floor and a second portion of a cargo area above the load floor when the load floor is in the extended position; and wherein the respective first longitudinal slot and the respective second longitudinal slot of each of the first and the second rails are open at an end of the respective rail so that the cargo retainer and the load floor are removable from the respective rail by moving the panels past the end of the respective rail.

13. The cargo system of claim 12, wherein the load floor is movable to an intermediate position in which some of the panels are folded together to extend substantially perpendicular to others of the panels that remain in the extended position.

14. A vehicle comprising:

a vehicle floor;

first and second side walls opposing one another; wherein the vehicle floor and the side walls partially define a cargo area;

a cargo system including:

first and second rails configured to extend longitudinally along the respective first and second side walls, each of the rails having a first slot extending along the length of the respective rail;

a load floor having multiple panels with adjacent ones of said multiple panels panels hinged to one another at adjacent edges so that the multiple panels are interconnected;

extensions extending from the multiple panels and configured to fit within the slots to retain the multiple panels to the rails, some of said extensions being adjacent a first terminal end of said interconnected panels and others of said extensions being adjacent a second terminal end of said interconnected panels to retain the first and second terminal ends to the rails;

wherein the rails are configured to support the load floor above the vehicle floor with the load floor extending between the rails;

wherein the load floor is configured to be movable along the rails between an extended position and a retracted position, with at least one pair of the adjacent edges that are hinged to one another being free from the rails so that said at least one pair of adjacent edges moves away from the rails and the first and second terminal ends of said interconnected panels are retained at the rails when the load floor is moved from the extended position to the retracted position; wherein the multiple panels divide the cargo area into a first portion below the load floor and above the vehicle floor and a second portion above the load floor when the load floor is in the extended position; wherein the vehicle floor is substantially uncovered when the load floor is in the refracted position;

a cargo retainer; wherein the rails are further configured to support the cargo retainer such that the cargo retainer spans between the rails and is above the load floor when the load floor is in the extended position, the cargo retainer thereby dividing the cargo area above the load floor between a forward cargo area and a rearward cargo area;

wherein each of the first and the second rails has a second longitudinal slot running fore and aft along the respective rail; wherein the cargo retainer includes first and second support posts that have terminal ends; wherein the second slots are configured to receive the terminal ends of the support posts; and wherein the second slots are open at ends of the rails so that the terminal ends of the support posts are removable from the second slots by moving the posts past the ends of the rails, the cargo retainer thereby being removable from the vehicle.

15. The vehicle of claim 14, wherein the cargo retainer extends substantially perpendicular to the side walls and extends substantially parallel to the load floor when the load floor is in the extended position.

* * * * *